United States Patent

[11] 3,615,842

[72] Inventors Donald W. Craft
Melrose;
Francis J. Porter, Jr., Beverly, both of Mass.
[21] Appl. No. 756,212
[22] Filed Aug. 29, 1968
[45] Patented Oct. 26, 1971
[73] Assignee General Electric Company

[54] METHOD AND APPARATUS COMPRISING AN ELECTROCHEMICAL ION EXCHANGE MEMBRANE PURGE PUMP IN COMBINATION AND FUEL CELL COMBINATION
4 Claims, 5 Drawing Figs.

[52] U.S. Cl. .................................................. 136/86, 55/158
[51] Int. Cl. .................................................. H01m 27/00
[50] Field of Search ............................................. 136/86

[56] References Cited
UNITED STATES PATENTS
3,080,442  3/1963  Hobart ........................ 136/86
3,266,938  8/1966  Parker et al. ................. 136/86

Primary Examiner—Allen B. Curtis
Assistant Examiner—H. A. Feeley
Attorneys—I. D. Blumenfeld, Frank L. Neuhauser, Oscar B. Waddell and Melvin M. Goldenberg ABSTRACT: A purge pump is arranged for removing inert gases and impurities from the reactant gases in fuel cells or fuel cell systems. Normal operation of fuel cells results in the accumulation of inert gases in the reactant gases after a period of operation, ultimately tending to blanket an electrode, causing the performance of the fuel cell to deteriorate. The purge pump, which is arranged to remove such materials at intervals, includes a housing incorporating an ion exchange membrane with electrodes on opposite sides thereof. Current collectors engaging the electrodes are formed of corrugated shape, the corrugations of one collector being transverse to those of the other collector. A chamber is provided adjacent one electrode for accumulating inert gases received from the fuel cell system. The housing of the purge pump has incorporated therewith an inlet valve at one end of the chamber for conducting inert gases from the system to the chamber and a second valve at the other end of the chamber for effecting discharge of inert gases from the chamber at intervals. When the inert gases accumulate in the chamber to an extent affecting performance by a predetermined amount an associated electrical circuit causes reversal of current through the purge pump. This results in an increase in pressure in the chamber causing the inlet valve to close and the discharge valve to open, thereby effecting a purging of the inert gases from the chamber. The circuit is arranged to return the system to normal operation after a time which insures complete purging without excessive loss of reactant gases.

INVENTORS
DONALD W. CRAFT
FRANCIS J. PORTER, JR.

BY
ATTORNEYS 3,615,842

METHOD AND APPARATUS COMPRISING AN ELECTROCHEMICAL ION EXCHANGE MEMBRANE PURGE PUMP IN COMBINATION AND FUEL CELL COMBINATION

This invention relates to apparatus for effecting removal of inert gases and impurities from the reactant gases in fuel cells and more particularly to an ion exchange membrane purge pump for effecting removal of such impurities to insure prolonged acceptable performance of fuel cells.

BACKGROUND OF THE INVENTION

A known type of electrochemical system for generating electricity is the fuel cell in which electrochemically consumable and regeneratable fluids are circulated to effect generation of electricity. Such cells typically may use an oxidizable fluid supplied adjacent to one electrode on one side of an electrolytic membrane while an oxidant is supplied adjacent to a second electrode on the other side of the membrane. In one common form of a fuel cell hydrogen is supplied to one side of the cell and air, containing oxygen, is supplied to the other side of this cell. In a known manner hydrogen ions pass through the membrane and ultimately combine with oxygen while the liberated electrons from the hydrogen atoms pass from one electrode to the other through an external circuit to provide usable electric current.

The air employed in such cells includes, of course, nitrogen which in the course of operation of the fuel cell eventually collects as an inert gas in the hydrogen. Ultimately, this inert material tends to "blanket" the electrode of the fuel cell, and performance seriously deteriorates unless provision is made for the removal of such inert material at intervals. In accordance with the present invention provision is made for effectively purging the inert material at appropriate intervals to maintain performance at an optimum level. This is effected by an electrochemical ion exchange membrane purge pump which, under appropriate conditions, causes the inert material to be discharged to an ambient medium.

It is an object of this invention, therefore, to purge inert gases when necessary in order to keep performance of an electrochemical conversion device at its optimum level.

It is another object of this invention to provide apparatus for effecting such purging which is arranged in a compact manner to achieve the desired result while minimizing the space and weight required.

It is a further object of this invention to provide such apparatus which permits more extended periods of operation between purgings.

It is another object of this invention to provide circuitry which insures complete purging without excessive loss of reactant gases.

SUMMARY OF THE INVENTION

In carrying out this invention, in one form thereof, an ion exchange membrane unit including the elements of a fuel cell is utilized as a portion of a compact purge pump. The unit includes an ion exchange membrane having electrodes on opposite sides thereof. In electrical contact with one electrode is a current collector having horizontal corrugations and in electrical contact with the other electrode is a second current collector having vertical corrugations. The horizontal corrugations of the first current collector provide multiple paths for the conducting of hydrogen adjacent to one electrode on one side of the membrane. The vertical corrugations of the second current collector provide passages for facilitating the collection of inert gases in the upper portion of the purge pump. A plurality of pads of a resilient material are disposed adjacent to the second current collector ro provide mechanical loading and to insure good electrical contact. Two check valves are provided for communication with the aforementioned passages formed by the corrugated current collector. A lower check valve is normally open and permits hydrogen and inert gases from the fuel cell to pass into the purge pump. The upper check valve is normally closed but is opened under predetermined conditions to permit discharge of the inert gases to an ambient medium. Electrical circuitry is provided to effect current reversal through the purge pump thereby altering pressure conditions to actuate the valves for initiating purging. The circuit is arranged to return the system to normal operation after a time which insures complete purging without excessive loss of reactant gases.

For a better understanding of this invention reference may be made to the accompanying drawings in which.

DETAILED DESCRIPTION

Figure 1:
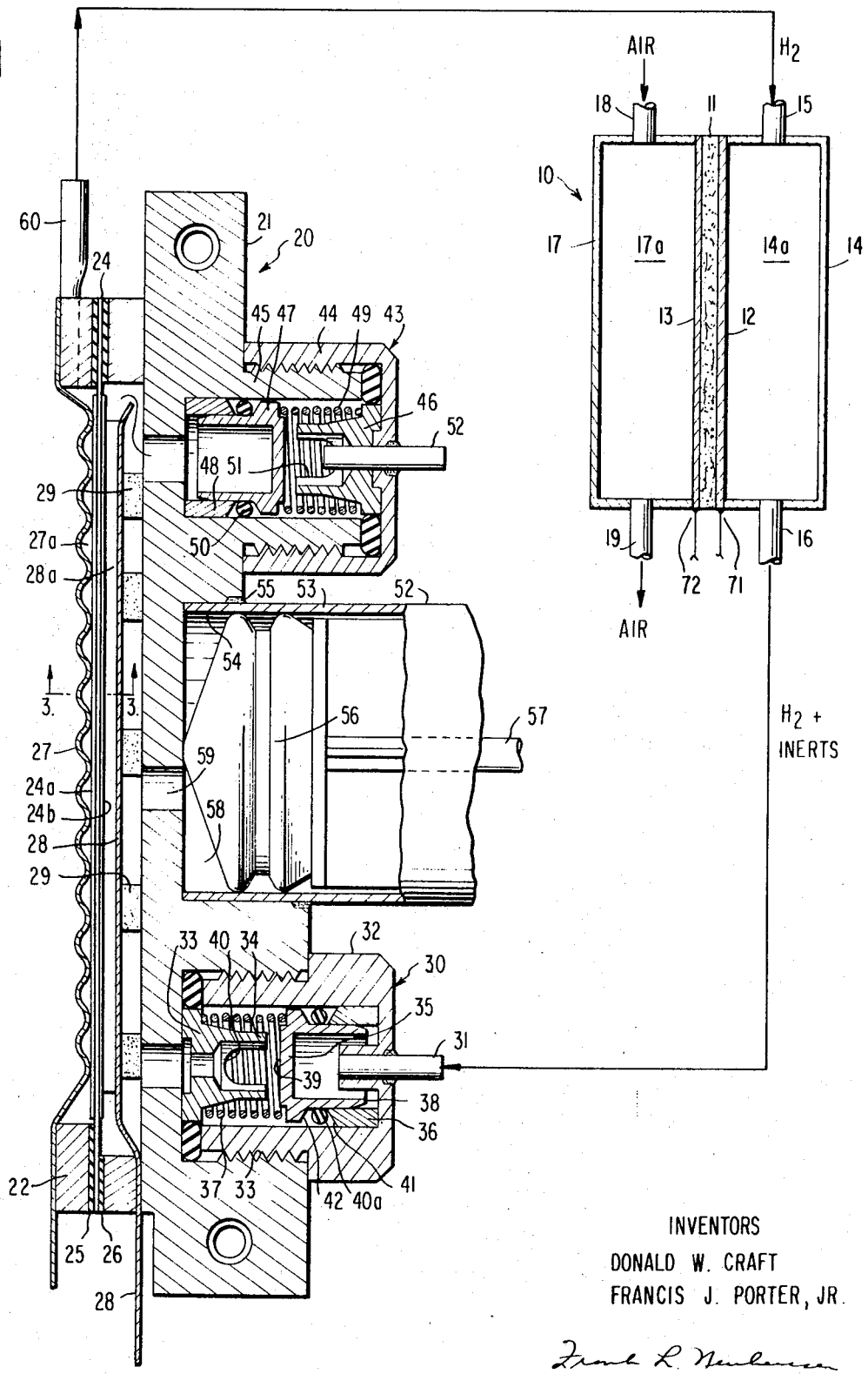
FIG. 1 is a vertical sectional view of the purge pump, shown in communication with a fuel cell.

Although it is contemplated that the purge pump of this invention would normally be used in a system in which a plurality of fuel cells connected in series are employed, for simplicity of illustration of this invention the purge pump is shown in FIG. 1 utilized with a single fuel cell. It will be apparent, as this description proceeeds, that any desired number of fuel cells may be connected in series, with gases flowing consecutively therethrough and with the electrodes connected to provide a series electrical path.

For simplicity the fuel cell unit 10 is illustrated schematically as including an electrolyte 11 having spaced electrodes 12 and 13 mounted in contact therewith. A housing portion 14 forms a chamber 14a adjacent the electrode 12 and is provided with an inlet conduit 15 and an outlet conduit 16 for facilitating flow of fluid in contact with the electrode 12. A second housing 17 forms a chamber 17a adjacent the second electrode 13 to provide means for a second fluid to be brought into contact with the electrode 13. Conduits 18 and 19 are provided for access of a second fluid to the chamber 17a.

In the form of a fuel cell illustrated hydrogen is supplied to the chamber 14a through the conduit 15. Air is employed as the second fluid within the chamber 17a. Air may be circulated through the chamber 17a or the chamber may simply be left open to the atmosphere to permit air to come in contact with the electrode 13. The fuel cell 10 is a conventional fuel cell and does not itself form part of this invention. A small fraction of the nitrogen forming part of the air entering the chamber 17a passes through the membrane 11 and into the chamber 14a, As the hydrogen passes through the chamber 14a, most of of the hydrogen is absorbed into the electrode 12 and consumed in the reaction process of the fuel cell. The nitrogen and other inerts are thus more concentrated as the hydrogen and inert gases enter the conduit 16 than they would be if the hydrogen were merely scavenging the inerts from chamber 14a. The fluid discharged through the conduit 16 includes not only hydrogen but also nitrogen and, in addition, some impurities included within the hydrogen entering through the conduit 15.

Figure 2:
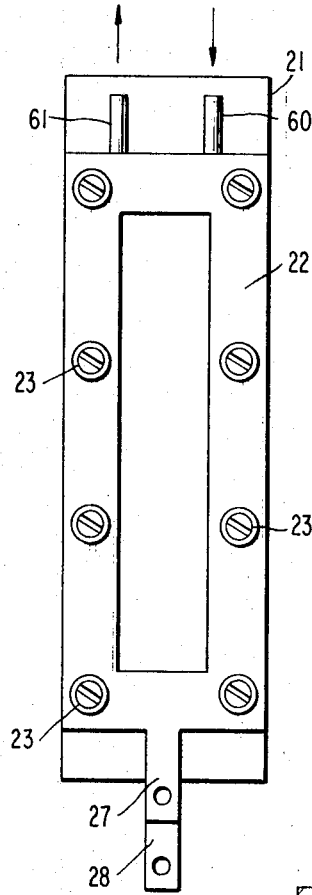
FIG. 2 is an elevation view of the purge pump viewed from the left in FIG. 1.

Accumulation of such inert material ultimately tends to "blanket" or "mask" the electrode, particularly near conduit 16, causing a deterioration in the performance of the fuel cell. In order to eliminate such performance deterioration and restore the fuel cell to its optimum operating condition, the ion exchange membrane purge pump of this invention is provided. The purge pump is shown at 20 in FIG. 1. It includes a first frame member 21 and a complementary frame member 22. The frame members are held in assembled position by a plurality of screws, shown at 23 in FIG. 2. The purge pump includes an ion exchange membrane 24 which is clamped between the two frame members 21 and 22. A gasket 25 is provided between the membrane and the frame member 22 and a gasket 26 correspondingly provided between the membrane and the frame member 21. An electrode is formed on each side of the membrane. Catalytic surfaces are formed on opposite sides of the membrane to provide electrodes 24 a and 24b.

Figure 3:
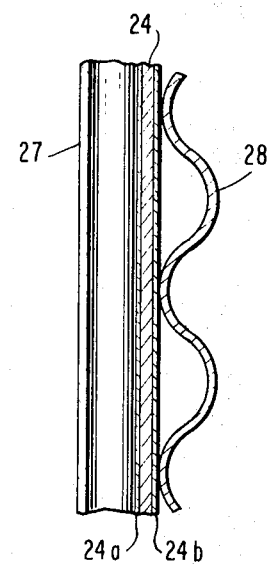
FIG. 3 is an enlarged section taken along the line 3—3 in FIG. 1 showing details of the internal construction of the ion exchange portion of the purge pump.
Figure 4:
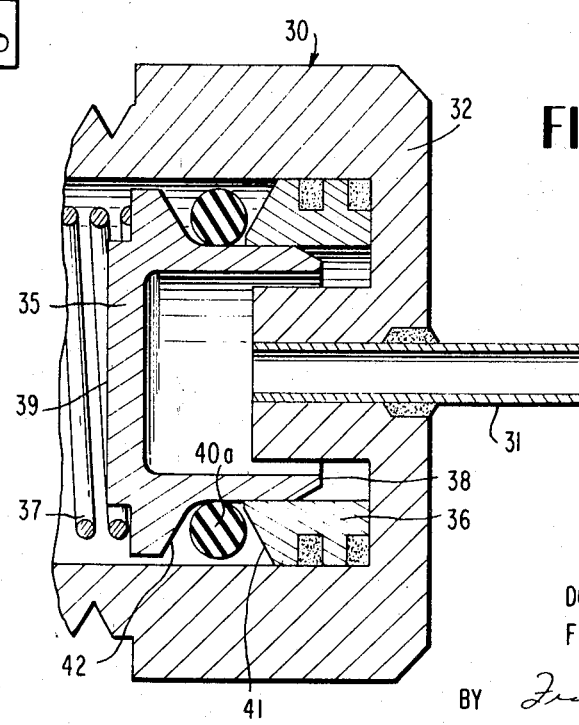
FIG. 4 is an enlarged view of a portion of a check valve forming part of the purge pump.

A current collector 27 is positioned on the outer side of the membrane 24. This collector is arranged in contact with the corresponding electrode 24a and is formed with a plurality of horizontal corrugations connected by vertical passages to provide a chamber 27a a for circulation of hydrogen over the surface of the electrode. A second collector 28 is provided in contact with the electrode 24b on the inner side of the membrane. This collector, as illustrated in FIG. 3, is also corrugated but with the corrugations providing vertical rather than horizontal channels.

In order to maintain mechanical loading of the collector 28 and to insure good electrical contact with the electrode 24b during operation of the purge pump, a plurality of resilient rubber pads 29 are arranged between the collector 28 and the frame member 21. The above arrangement of the collector 28 provides a chamber 28a of substantial size adjacent to electrode 24b.

Adjacent to, and in communication with the lower end of the chamber 28a is a check valve 30. This valve is open during normal operation of the system to permit ingress of hydrogen and inert gases from the fuel cell 10 through the conduit 31. The check valve 30 includes an outer housing member 32 which is arranged in threaded relationship within a recess 33 in the frame member 21. The check valve includes a tapered member 33 having passage 34 therethrough communicating with the lower end of the chamber 28a. The end 34 of the tapered member 33 forms a stop limiting extreme movement of a piston 35 under low pressure conditions in the chamber 28a. The piston 35 is slidably received within a tubular guide member 36. The dimensional relationship of the piston 35 and the tubular member 36 is such that fluid may pass therebetween but the tubular member still has sufficiently close fit with the piston to provide a guide therefore.

The piston is biased to the right as viewed in FIG. 1 by a compression spring 37 which engages the base of the tapered member 33 and the face of the piston 35. Movement of the piston to the right is limited by engagement of the end 38 of the piston with the inner wall of the housing 32. Conversely, movement of the valve element to the left is limited by engagement of the face 39 thereof with the end 34 of the tapered member 33. The end of the tapered member includes a recess or slot 40 to permit passage of fluid therethrough when the piston is in engagement with the end thereof.

On the outer surface of the piston 35 and between this surface and the inner wall of the housing 32 there is provided an O-ring 40a for effecting sealing of the passage through the valve under appropriate operating conditions. The tubular member 36 has a chambered or inclined face 41 and the piston has a similarly inclined face 42 forming a chamber within which the O-ring is positioned.

When the valve 30 is in its leftward position (as viewed in FIG. 1) the fluid, consisting of hydrogen and inerts, may pass through the conduit 31, through the clearance between the piston 35 and the tubular guide member 36, past the O-ring, through the spaces between the coils of the spring 37, through the slot 40 into the chamber 28 a and thence upwardly through the vertical passages to the upper end of the purge pump adjacent to a second check valve 43. Conversely, when the piston 35 is caused to move to the right the O-ring is squeezed between the surfaces 41 and 42 to provide a seal, preventing passage of fluid through the valve.

The second valve 43 at the upper portion of the purge pump is constructed in a manner essentially the same as that of valve 30 except that the elements thereof are reversed. The valve 43 includes a housing 44 which is mounted in screw-threaded engagement with a threaded projecting tubular portion 45 of the frame member 21. The valve 43 includes a tapered member 46 and a slidable piston 47. The piston 47 is slidably received within a tubular guide element 48. The piston 47 is biased to the left by a compression coil spring 49 and an O-ring 50 is arranged on the external surface of the piston 47.

As in the case of the valve 30, fluid from the upper end of the chamber 28a may pass between the piston 47 and the tubular guide member 48, past the O-ring 50, between the coils of the spring 49, through a slot 51 in the end of the tapered member 46 and thence through the conduit 52 to the ambient medium.

It will be seen that the purge pump, including the ion exchange membrane and the electrodes and current collectors associated therewith and the integrally arranged check valves, form a very compact structure, providing a saving in space and weight which is very important in many applications of fuel cell technology.

In order to provide for initial purging of undesired fluids from the chamber 28a and to provide for purging at any time supplementing the electrochemical action of the purge pump, a manually operated pump 52 is incorporated in the assembly. This pump includes a housing 53 mounted within a recess 54 formed in the frame member 21. The housing 53 is welded or otherwise bonded to the frame member, as indicated generally at 55. Within the housing is arranged a piston 56 which may be manually or mechanically moved in any desired manner by a suitable connection to the end of the piston rod 57. The piston chamber 58 communicates with the chamber 28a of the purge pump through a passage 59 in the frame member 21. When it is desired to purge inerts at the beginning of operation of the fuel cell the piston 56 is first moved to the right for one stroke and then moved through a return stroke to the left. Movement to the right causes the valve 30 to be opened and the valve 43 to remain closed but with increased sealing force, resulting in hydrogen and inerts being drawn into chamber 28a. On the return stroke to the left valve 30 closes and valve 43 opens, causing a discharge of the hydrogen and inerts from chamber 28a to ambient.

OPERATION

In operation, hydrogen from a chemical generator is supplied to the outer electrode 24a of the purge pump through an inlet conduit 60. The hydrogen so supplied flows through the passages between the corrugated collector 27 and the electrode 24a and is discharged through the conduit 61 (shown in FIG. 2). The hydrogen is supplied to the fuel cell 10 through the inlet conduit 15. During the operation of the fuel cell a small fraction of the nitrogen from the air admitted through conduit 18 passes into the chamber 14a and is discharged through the conduit 16 mixed with hydrogen. The fluid discharged through the conduit 16 includes not only hydrogen and nitrogen but may also include other inert material present as impurities in the hydrogen supplied to the inlet conduit 60 of the purge pump. The hydrogen and inerts from the discharge conduit 16 pass through a conduit 31 into the valve 30. During initial operation of the system a vacuum exists in the chamber 28a of the purge pump and the check valve 30 is open so that the fluid received at the conduit 31 passes into the chamber 28a of the purge pump and then upwardly through the vertical passages to an area adjacent the closed check valve 43.

During this operation of the ion exchange membrane purge pump hydrogen ions pass through the membrane 24 to the region adjacent the collector 27 and the hydrogen is then recirculated through the fuel cell 10. In other words, the hydrogen in the gaseous mixture of hydrogen and inerts is "pumped" electrochemically as protons through the membrane 24 and reforms as hydrogen atoms on the outer side of the membrane 24 for recirculation as mentioned above. As the inert gases gradually build up in the chamber 28a of the purge pump and begin to "blanket" the electrode 24b b of the purge pump the membrane and electrode resistance increases and a corresponding increase in voltage develops thereacross. Because of the substantial size of the storage space provided by the chamber 28a a substantial period of operation is permitted before such "blanketing" occurs and before purging of the inerts becomes necessary.

When, however, the inerts have accumulated to a sufficient extent to increase the voltage across the electrochemical portion of the purge pump to a predetermined value the polarity of current to the purge pump is caused to reverse. This causes hydrogen to be "pumped" from the outer side of the membrane to the inner purge pump chamber 28a, thereby increasing the pressure within this chamber from a negative pressure to a positive pressure. This positive pressure effects a closing of the valve 30 and a contemporaneous opening of the valve 43. This blocks a flow of fluid from the conduit 31 and, of course, prevents reverse flow of fluid into the conduit 31 and at the same time effects a purging of the inerts in the purge pump chamber 28a to ambient through the valve 43 and conduit 52.

The reversal of polarity of the current in the purge pump may be effected in any desired manner. For example, provision may be made for sensing the voltage across the membrane of the purge pump and reversal of the polarity of the current may be effected when this voltage reaches a predetermined value. The purging operation may be continued for a predetermined time or terminated in any other suitable manner. For example, when the valve 30 is closed, thereby blocking passage of inerts from the fuel cell 10 to the purge pump, these inerts tend to collect the chamber 14a and to blanket the electrode 12. This causes an increase in resistance across the membrane 11 and a resulting increase in voltage. This voltage may be sensed to effect return of the polarity of current to that originally existing at the purge pump and thereby to return the operation of the system to normal.

Figure 5:
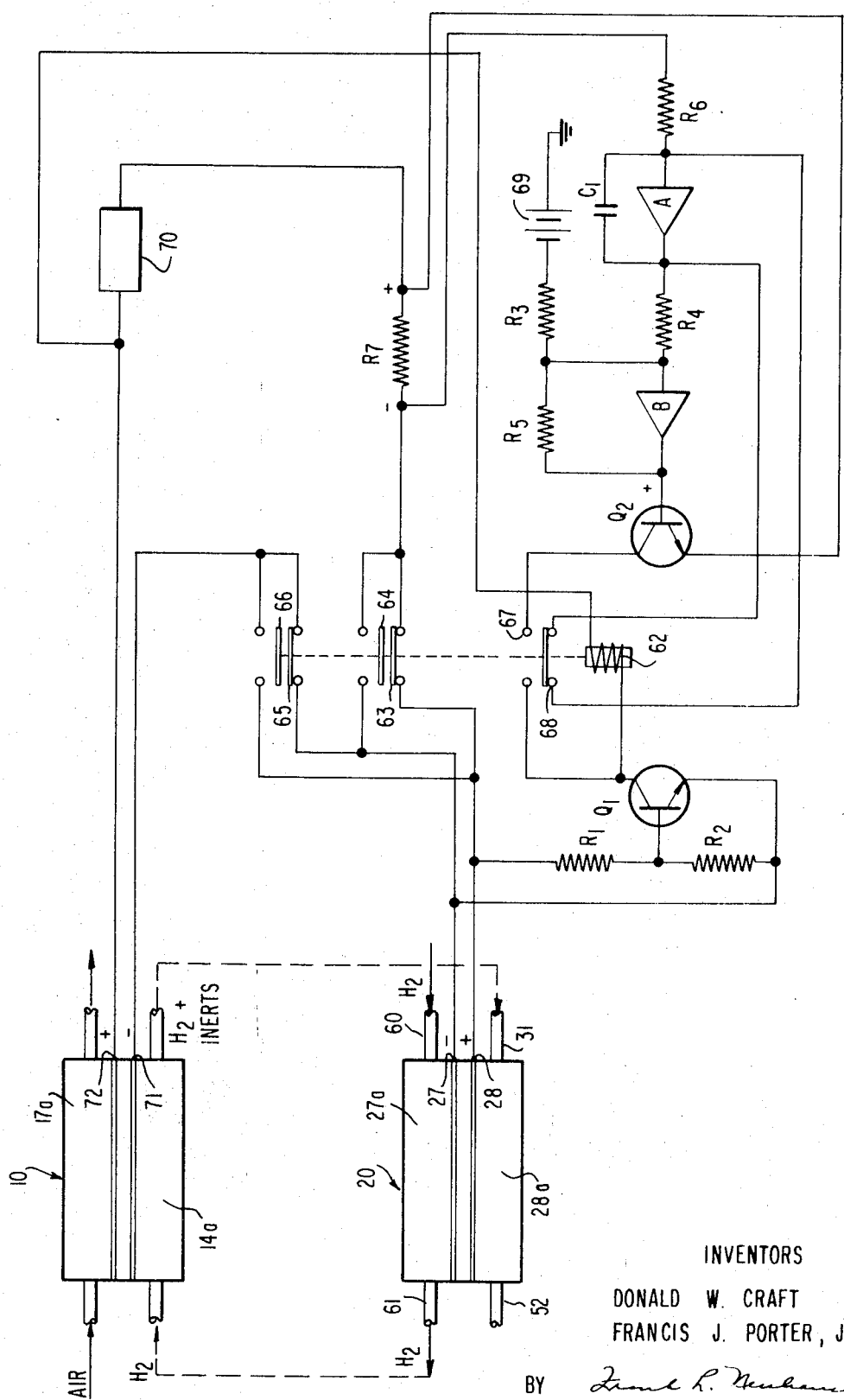
FIG. 5 is a diagram showing in schematic form a circuit for effecting shift in operation of the ion exchange membrane purge pump to effect purging of inerts and for effecting return of the system to normal operation.

One form of circuit for accomplishing the purging of inert gases and for returning the system to normal operation is shown in FIG. 5. THe circuit includes a transistor $Q_1$ whose collector is connected to a solenoid 62. Bias for the base of the transistor $Q_1$ is supplied from the purge pump 20 through a voltage divider circuit consisting of resistors $R_1$, $R_2$ connected in series across the collectors 27, 28 of the purge pump.

The solenoid 62 is arranged to actuate a plurality of switches 63, 64, 65, 66, 67 and 68.

A transister $Q_2$ is connected to the switch 67 to provide a path for continued energization of the solenoid 62 during the purging operation. Bias for the base of transistor $Q_2$ is controlled by a circuit including operational amplifiers A and B.

The operational amplifier B is wired to cause the output thereof to be proportional to the algebraic sum of the voltages at the inputs of summing resistors $R_3$, $R_4$, these two resistors having the same resistance. A feedback resistor $R_5$ is connected across the operational amplifier B.

The output of operational amplifier A is supplied to resistor $R_4$. A fixed negative potential 69 is supplied to the other adding resistor $R_3$.

Input to the operational amplifier A is supplied through a resistor $R_6$ from the potential at one end of a resistor $R_7$ connected in the load circuit of fuel cell 10. The load is indicated by the block 70 and the terminals of the fuel cell are indicated by 71, 72. A capacitor $C_1$ is connected across the operational amplifier A to perform an integrating function.

In normal operation the operational amplifier A is shorted by the switch 68 and its output is thereby held at 0 volts. The operational amplifier B has, therefore, only a single effective input from resistor $R_3$ and supplies a positive bias to the transistor $Q_2$.

The operation of the system is as follows. In normal operation of the system, with the solenoid 62 deenergized, the switches are positioned as shown in FIG. 5. The voltage bias at the base of the transistor $Q_1$ is low since the source of this bias voltage is the voltage across the electrode of the purge pump 20. As inerts accumulate in the chamber 28a the voltage between the electrodes of the purge pump, and hence between the collectors 27, 28 indicated in FIG. 5, increases. When the base voltage of transistor $Q_1$ increases to a predetermined value, say 0.5 volts, transistor $Q_1$ is biased so as to turn on, thereby energizing the solenoid 62.

The energization of the solenoid 62 causes the switches 63, 65 and 68 to open and switches 64, 66 and 67 to close. The opening of switches 63 and 65 and the closing of switches 64 and 66 effect the reversal of current through the purge pump 20. The opening of switch 68 removes the short across operational amplifier A and the closing of switch 67 allows current to continue to flow through solenoid 62 by means of a seal-in path through transistor $Q_2$. This renders the continued energization of the solenoid 62 independent of the condition of the transistor $Q_1$.

Transistor $Q_2$ is normally biased to turn on because of the positive bias supplied to the base thereof during normal operation of the system. This bias is supplied from operational amplifier B whose output is proportional to the algebraic sum of voltages at the inputs of summing resistors $R_3$ and $R_4$. Since the output of operational amplifier A supplied to resistor $R_4$ is zero, because of the short provided by switch 72, and a fixed negative potential is supplied to resistor $R_3$ positive bias is supplied to the base of transistor $Q_2$ by the output of operational amplifier B.

In the reverse current mode of operation, that is, when the current is reversed through the purge pump 20, the output of operational amplifier A increases with a positive polarity. Since resistors $R_3$, $R_4$ have the same value, where the absolute value of the voltage output of the operational amplifier A exceeds the absolute value of the fixed negative potential 69, a negative voltage appears at the output of operational amplifier B and transistor $Q_2$ is turned off, the solenoid 62 is deenergized, the switches 63–68 return to the position shown in FIG. 5, and normal operation of the system is resumed.

Because of the capacitor $C_1$ and the connection to resistor $R_7$ in the load circuit operational amplifier A has the capability of providing an output which is proportional to the integral of the product of instantaneous current and incremental time over a time period. The output of the operational amplifier A is directly proportional to the current through the purge pump in the reverse current mode since the voltage drop across the resistor $R_7$ in the load circuit forms the input, via resistor $R_6$, to the operational amplifier A. The output is proportional to time because capacitor $C_1$ causes the operational amplifier A to act as an integrator whose output voltage is defined as $$R_6 C_1 \int_0^t E_{in} dt.$$

Integrating current with respect to time yields the number of ampere-seconds (coulombs) that have passed through the purge pump during the reverse current mode of operation. The volume of hydrogen that is electrochemically pumped is directly proportional to the coulombs at given temperature and pressure. This control of the time during which the purge pump is in the reverse current mode insures complete clearance of accumulated inerts from chamber 28a without excessive loss of hydrogen which would reduce the total duration of operation of the fuel cell.

While there has been shown and described a specific embodiment of this invention, it is not intended that the invention be limited to the particular construction shown and described and it is intended by the appended claims to cover all modifications coming within the spirit and scope of this invention.

What is claimed as new and desired to be secured by Letters Patent of the United States is:

1. In combination a closed loop system comprising a fuel cell and a purge pump for removing inerts entrained in the hydrogen stream exiting from the fuel cell and recirculating the purified hydrogen to the fuel cell, a. a fuel cell having first and second spaced electrodes,
b. an ion transport medium between said electrodes, c. a housing having an inlet and an outlet adjacent to said first electrode for permitting flow of hydrogen past said first electrode,
d. means supplying an oxidant to said second electrode, said oxidant containing inerts which pass through the ion transport medium and are entrained in the hydrogen stream exiting from the outlet of said housing,
e. purge pump means including a housing,
f. an ion exchange membrane positioned in said housing to form two chambers, said chambers being adjacent to opposite sides of said membrane,
g. electrodes positioned on opposite sides of said membrane,
h. an inlet in said first of said chambers, said inlet communicating with the outlet of said fuel cell housing whereby the hydrogen stream having the inerts entrained therein is brought into the first chamber,
i. an outlet in the remaining of said chambers communicating with the inlet of said fuel cell housing,
j. means to convert the hydrogen in said first chamber to ions for passage across said membrane into said second chamber while retaining the inerts in said first chamber whereby the inerts entrained in the exiting hydrogen stream are removed and the purified hydrogen is recirculated to said fuel cell,
k. means for producing an electrical signal proportional to the inert concentration in said first chamber, and
l. valve means responsive to said electrical signal to remove said inerts whenever the inert concentration exceeds a predetermined level.

2. The combination according to claim 1 in which said valve means includes a normally open valve and a normally closed valve and means for reversing the position of the valves in response to en electrical signal to remove the inerts.

3. A process for generating electrical energy in a fuel cell in which a hydrogen fuel is circulated and purged to remove inerts comprising the steps.
   a. providing a fuel cell having a cathode and anode in spaced relation,
   b. ionically communicating the anode and cathode,
   c. delivering hydrogen to the anode and an oxidant containing inerts to the cathode so that part of the hydrogen is consumed and some of the inerts pass from the cathode to the anode and are entrained in the unconsumed hydrogen,
   d. providing an ion exchange membrane having spaced electrodes on opposite sides,
   e. delivering the inert containing hydrogen stream from the fuel cell by pumping to one of the electrodes where hydrogen is electrochemically pumped across the membrane to the other side thereby removing the inerts from the hydrogen,
   f. recirculating the purified hydrogen to the fuel cell anode,
   g. and discharging the inerts from said one electrode whenever the inert concentration exceeds a predetermined level.

4. The process according to claim 3 wherein the inert concentration is sensed to produce an electrical signal and said electrical signal controls discharging of said inerts.

* * * * *